United States Patent Office 2,817,659
Patented Dec. 24, 1957

2,817,659

POLYAZO DYESTUFFS

Werner Bossard, Riehen, near Basel, and Marcel Reding, Basel, Switzerland, assignors to J. R. Geigy A.-G., Basel, Switzerland, a Swiss firm No Drawing. Application June 11, 1956
Serial No. 590,350

Claims priority, application Switzerland June 27, 1955

7 Claims. (Cl. 260—157)

The invention is concerned with substantive disazo and trisazo dyestuffs, their production and their use for the dyeing of cellulose material in fast, in particular very fast to light, yellow-orange, orange to yellow-brown shades.

It has been found that very valuable substantive disazo and trisazo dyestuffs are obtained if an o-amino polyazo dyestuff of the general Formula I

which contains at least 2 and at most 5 sulphonic acid groups, is oxidised by methods known per se to form a 1.2.3-triazole compound of the general Formula II

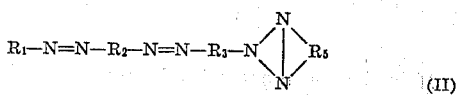

In these formulae:

$R_1$ represents an aromatic radical of the isocyclic or heterocyclic series which may possibly contain an arylazo group, preferably in the p-position to the azo linkage, $R_2$ and $R_3$ represent radicals of middle components usual in polyazo dyestuffs which contain the azo groups preferably in p-position to each other in a benzene ring which may possibly form part of a fused ring system, $R_4$ represents the radical of an azo component coupling in the o-position to a primary amino group, and $R_5$ represents an aromatic radical bound by neighbouring carbon atoms to the triazole ring.

In these dyestuffs, $R_1$ can represent the radical of a starting component usual in azo dyestuffs, preferably the radical of an aminobenzene or aminonaphthalene compound; also for example it can represent the radical of a 2-(p-aminophenyl)-benzo- or -naphtho- thiazole or triazole compound. In these compounds, the aromatic rings can be further substituted, e. g. with halogen, hydroxyl, carboxyl, alkyl, alkoxy and sulphonic acid groups as well as with the radicals of polynuclear compounds, e. g. with phenyl, benzyl or styryl groups. They may also be further substituted with arylazo groups and the 4 latter can again be further substituted. In this substitution, arylazo groups take preferably the p-position to the azo group in a benzene ring linked to $R_2$, which benzene ring can form part of a fused ring system, e. g. a naphthalene, benztriazole or indazole ring. Thus $R_1$ can be derived for example from 1-aminobenzene-3- or -4-sulphonic acid or carboxylic acid, 1-aminobenzene-2.4 or -2.5-disulphonic acid, 4-chloro-1-aminobenzene-3-sulphonic acid, 4.6-dimethyl-1-aminobenzene-2-sulphonic acid, 5-amino-2-hydroxybenzene-1-carboxylic acid and the corresponding 3-sulphonic acid, 4-aminodiphenyl-3-sulphonic acid, 4'-acetylamino-4-aminodiphenyl-3-sulphonic acid, 4-nitro- or 4-acylamino-4'-aminostilbene-2.2'-disulphonic acids, 1-aminonaphthalene-4-, -5-, -6- or -7-sulphonic acid, 2-aminonaphthalene-6- or -7-sulphonic acid, 2-aminonaphthalene-3.6- or -5.7- or -4.8-disulphonic acid, 1-aminonaphthalene-3.6-disulphonic acid, 3-aminopyrene disulphonic acid, 2-(4'-aminophenyl)-5-methyl benzthiazole mono- and disulphonic acids, 2-(4'-aminophenyl)-naphthotriazole-5.7-disulphonic acid, 2-(4'-aminophenyl)-naphthothiazole-5.7-disulphonic acid, 2-(4'-aminophenyl)-naphthimidazole-5.7-disulphonic acid, 4-(naphthotriazolyl-2)-4'-aminostilbene-2.2'-disulphonic acid. $R_1$ can also be derived from amino monoazo dyestuffs which are obtained by coupling one of the diazo components listed above with a middle component usual in polyazo dyestuffs coupling in the p-position to a primary amino group, as is defined and illustrated in the following under $R_2$ and $R_3$. Also $R_1$ can be derived from 4-aminoazobenzene and the mono- and di-sulphonic acids thereof which can also be further substituted, e. g. by methyl or methoxy groups.

$R_2$ and $R_3$ are derived from the middle components usual in polyazo dyestuffs, i. e. chiefly from primary amino compounds of the benzene, naphthalene and heterocyclic series which are capable of coupling in the p-position to the amino group. Examples of such middle components are: 1-aminobenzene, 1-amino-2-methylbenzene (which is preferably used in the form of the corresponding N-methyl sulphonates and, after coupling, is saponified in an alkaline medium), 3-methyl-1-aminobenzene, 2.5-dimethyl-1-aminobenzene, 1-amino-3-methoxybenzene, 1-amino-3-acetaminobenzene, 1-amino-2-methoxy-5-methylbenzene, 1-amino-2.5-dimethoxybenzene, 1-aminonaphthalene-6- or -7-sulphonic acid, 2-methoxy- or 2-ethoxy-1-aminonaphthalene-6-sulphonic acid, 4-amino-6-methyl benztriazole and 4-amino indazole. It is of advantage to the fastness properties of the end products according to the present invention if $R_3$ is a radical of the benzene series.

All azo components of the benzene, naphthalene, anthracene and heterocyclic series coupling in o-position to a primary amino group can be used as end components corresponding to $R_4$. Examples are: 1.3-diaminobenzene, 2.4-diamino-1-methylbenzene, 2.4-diaminobenzene-1-sulphonic acid, 4 - amino - 2 - methoxy - 1 - methylbenzene, 5-amino-2-methoxy-1-methylbenzene, 1 - aminonaphthalene-4- and -5-sulphonic acid, preferably however, the 2-aminonaphthalene compounds coupling in the 1-position such as, e. g. 2-aminonaphthalene, 2-aminonaphthalene-1-sulphonic acid, 2-aminonaphthalene-5-, -6- or -7-sulphonic acid, 2-aminonaphthalene-3.6- or -5.7-disulphonic acid, 2-aminonaphthalene-3-carboxylic acid, 2-amino-3-carboxynaphthalene-6-sulphonic acid, 2-amino-8-hydroxynaphthalene-6-sulphonic acid, 2-amino-5-hydroxynaphthalene-7-sulphonic acid, also 2-amino anthracene, 5-aminobenztriazole, 5-amino-2-phenylbenztriazole-3'- or -4'-sulphonic acid. It is of advantage for the properties of the dyestuffs according to the present invention to use end components which contain no further amino groups, apart from those which couple in the o-position to the azo group, and which contain no aromatically bound hydroxyl group. In this regard the 2-aminonaphthalene compounds coupling in the 1-position are particularly mentioned. In general, the polyazo dyestuffs according to the present invention are particularly valuable when they contain no aromatically bound amino and hydroxyl groups, i. e. if components are used for building up the dyestuff of the general Formula I which do not introduce any such groups; also, in general, the disazo dyestuffs according to the present invention are more valuable than the trisazo dyestuffs and are, therefore, to be preferred.

The o-amino polyazo dyestuffs of the general Formula I are oxidised to form the 1.2.3-triazole compounds of the general Formula II by methods known per se with oxidising agents which are capable of forming the triazole ring in an alkaline solution. Cupritetrammine salts for example can be used such as are obtained for example in aqueous solution of the copper sulphate with excess ammonia or with excess organic amines, e. g. ethanolamines. Alkali hypochlorites can also be used as oxidising agents.

The oxidation is performed in aqueous solution, advantageously in the warm, possibly while introducing air or oxygen. The completion of the oxidation is generally easily seen by a hypsochromic change of colour of the solution. The dyestuffs according to the present invention are precipitated with salt from the oxidation solutions which are mostly alkaline and then isolated.

In the form of their alkali salts, e. g. the lithium, sodium, potassium or ammonium salts, the new disazo and trisazo dyestuffs according to the invention are water soluble yellow-orange, orange to brown powders. They dye cellulose material such as cotton and regenerated cellulose fibres from a dyebath containing Glaubers salt in orange to orange-brown shades which are very fast to light.

The following examples illustrate the invention. Where not otherwise stated, parts are given as parts by weight. The temperatures are in degrees centigrade. The relationship of parts by weight to parts by volume is as that of grammes to cubic centimetres.

EXAMPLE 1

54 parts of the amino disazo dyestuff obtained by coupling diazotised 2-aminonaphthalene-4.8-disulphonic acid with 1-amino-3-methlybenzene, further diazotisation of the amino monoazodyestuff obtained and coupling with 1-amino-3-methylbenzene, are dissolved at 60° with the addition of sodium carbonate so that the reaction is neutral. 7 parts of sodium nitrite are added and the mixture is diazotised by the quick addition of 32 parts of hydrochloric acid at 10–12°. This diazonium compound is poured at 10° into a neutral solution of 22.3 parts of 2-aminonaphthalene-6-sulphonic acid in 300 parts of water. The coupling is performed with a neutral reaction by the simultaneous addition dropwise of sodium carbonate solution. The completely formed amino trisazo dyestuff is precipitated at 60° with sodium chloride, pasted in 1000 parts of water and heated to 98°. A solution of 50 parts of crystallised copper sulphate in 200 parts of water and 100 parts of 25% ammonia solution is added. After boiling for one hour, the violet red suspension changes to an orange colour. The acidified dyestuff is filtered off, the filter cakes are dissolved with an alkaline reaction in 2000 parts of water and separated with sodium chloride. The dyestuff obtained, when dry, is an orange-yellow powder which dissolves in water with an orange-yellow and in concentrated sulphuric acid with a blue colour. It dyes cotton a yellowish orange shade and the dyeings have excellent fastness to light. The dyeings can be discharged in a neutral and in an alkaline medium. The new dyestuff, as free acid, corresponds to the formula:

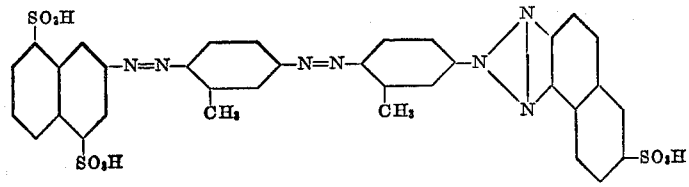

If in the above example, the components given in the following table are used to form the aminotrisazo dyestuff and the oxidation is performed by the method described or with 140 parts of sodium hypochlorite solution, which contains 18% active chlorine, then dyestuffs are obtained which have similar properties.

Table

SC→M₁→M₂→EC

| No. | Starting component | (1)(2) middle component | end component | Colour | | |
|---|---|---|---|---|---|---|
| | | | | in substance | in water | of cellulose dyeing |
| 1 | 2-aminonaphthalene-4.8-disulphonic acid. | (1) 1-amino-3-methylbenzene. (2) 1-amino-3-acetylaminobenzene. | 2-aminonaphthalene-6-sulphonic acid. | red | yellow-orange | orange. |
| 2 | ___do___ | (1) 1-amino-3-acetylaminobenzene. (2) 1-amino-3-acetylaminobenzene. | 2-aminonaphthalene. | red-brown | ___do___ | Do. |
| 3 | 2-aminonaphthalene-6.8-disulphonic acid. | (1) 1-amino-3-methylbenzene. (2) 1-amino-3-methylbenzene. | 2-aminonaphthalene-6-sulphonic acid. | yellow-brown | brown-yellow | yellow-orange. |
| 4 | ___do___ | (1) 1-amino-3-methylbenzene. (2) 1-amino-2-methoxybenzene. | 2-aminonaphthalene. | red-brown | orange | orange. |

Table—Continued

| No. | Starting component | (1)(2) middle component | end component | Colour in substance | Colour in water | Colour of cellulose dyeing |
|---|---|---|---|---|---|---|
| 5 | 2-aminonaphthalene-4.8-disulphonic acid | (1) 1-amino-2-methoxybenzene (2) 1-amino-3-acetylaminobenzene | 1-aminonaphthalene-3-sulphonic acid | yellow-brown | orange | yellow-orange |
| 6 | 2-aminonaphthalene-3.6-disulphonic acid | (1) 1-amino-3-methylbenzene (2) 1-amino-3-methylbenzene | 1-aminonaphthalene-4-sulphonic acid | brown | do | Do. |
| 7 | do | (1) 1-amino-3-acetylaminobenzene (2) 1-amino-2-methoxy-5-methylbenzene | 2-aminonaphthalene-6-sulphonic acid | do | do | yellow-brown |
| 8 | 2-aminonaphthalene-5.7-disulphonic acid | (1) 1-amino-3-methylbenzene (2) 1-amino-2-methoxy-5-methylbenzene | 2-aminonaphthalene-5-sulphonic acid | do | do | Do. |
| 9 | do | (1) 1-amino-3-methylbenzene (2) 1-amino-3-methylbenzene | 2-aminonaphthalene-6-sulphonic acid | do | do | orange. |
| 10 | 1-aminonaphthalene-3.6-disulphonic acid | (1) 1-amino-3-methylbenzene (2) 1-amino-3-methylbenzene | do | red-brown | yellow-brown | yellow-orange |
| 11 | do | (1) 1-amino-2-methoxy-5-methylbenzene (2) 1-amino-2-methoxy-5-methylbenzene | 2-aminonaphthalene-5-sulphonic acid | brown | orange | yellow-brown |
| 12 | 2-aminonaphthalene-4.8-disulphonic acid | (1) 1-amino-3-methylbenzene (2) 1-amino-2-methoxy-5-methylbenzene | 2-aminonaphthalene-3.6-disulphonic acid | red-brown | do | yellow-orange |
| 13 | 2-aminonaphthalene-6.8-disulphonic acid | (1) 1-amino-3-methylbenzene (2) 1-amino-3-methylbenzene | 5-aminobenztriazole | brown | yellow | Do. |
| 14 | 1-aminonaphthalene-3.6-disulphonic acid | (1) 1-amino-3-methylbenzene (2) 1-amino-3-methylbenzene | 5-aminobenzthiazole | do | do | Do. |
| 15 | 2-aminonaphthalene-4.8-disulphonic acid | (1) 1-amino-3-methylbenzene (2) 1-amino-3-methylbenzene | 1-amino-3-hydroxybenzene-4-carboxylic acid | do | yellow-brown | brown. |
| 16 | do | (1) 1-amino-3-methylbenzene (2) 1-amino-3-acetylaminobenzene | 1-amino-3-methoxy-4-methylbenzene | do | do | yellow-orange |
| 17 | do | (1) 1-amino-3-methylbenzene (2) 1-amino-3-methylbenzene | 1.3-diaminobenzene | yellow-brown | do | brown. |
| 18 | do | (1) 1-amino-3-methylbenzene (2) 1-amino-3-methylbenzene | 2-aminonaphthalene-7-sulphonic acid | red-brown | orange | orange. |
| 19 | dehydrothiotoluidine sulphonic acid | (1) 1-sulphacetylamino-3-aminobenzene (2) 1-amino-3-methylbenzene | 2-aminonaphthalene-6-sulphonic acid | brown | do | yellow-orange |
| 20 | 2-aminonaphthalene-6.8-disulphonic acid | (1) 1-amino-3-methylbenzene (2) 1-amino-3-methylbenzene | 2-aminonaphthalene-7-sulphonic acid | yellow-brown | yellow-brown | yellowish-orange |
| 21 | 2-aminonaphthalene-4.8-disulphonic acid | (1) 1-aminobenzene (2) 1-amino-3-methylbenzene | 2-aminonaphthalene-6-sulphonic acid | red-brown | yellow-orange | yellow-orange |
| 22 | do | (1) 1-aminobenzene (2) 1-amino-3-carbomethoxyaminobenzene | 2-aminonaphthalene-7-sulphonic acid | do | do | orange. |
| 23 | do | (1) 1-amino-3-methylbenzene (2) 1-amino-3-carbethoxyaminobenzene | 2-aminonaphthalene-6-sulphonic acid | do | orange | Do. |

EXAMPLE 2

57.5 parts of the aminodisazo dyestuff 1-aminonaphthalene-4-sulfonic acid→ 1 - aminonaphthalene - 6 - sulphonic acid→3-methyl-1-aminobenzene are diazotised by the method described in Example 1 and coupled with 22.3 parts of 2-aminonaphthalene-6-sulphonic acid to form the amino trisazo dyestuff. The completely formed dyestuff is precipitated from the alkaline solution with sodium chloride and suspended in 1000 parts of water. It is then treated at a raised temperature with 25 parts of sodium hypochlorite 100% (as aqueous solution) until the colour changes from violet to yellow-brown. Sodium bicarbonate is added to the cooled dyestuff solution until it no longer has a caustic alkaline reaction and the end dyestuff is precipitated with sodium chloride. After filtering off, the residue is washed free of alkali with concentrated sodium chloride solution and dried. The dyestuff is a brown-red powder which dissolves in water with an orange-brown and in concentrated sulphuric acid with a violet colour. It dyes cellulose fibres in yellowish brown shades which have remarkable fastness to wet and light.

The free acid of the dyestuff corresponds to the formula:

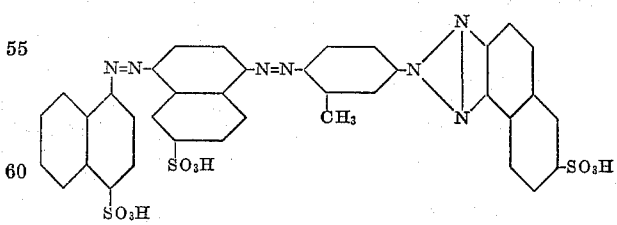

If, instead of the combination 1-aminonaphthalene-4-sulphonic acid→ 1-aminonaphthalene-6-sulphonic acid→1-amino-3 - methylbenzene→2 - aminonaphthalene - 6 - sulphonic acid, a combination given in the following table is oxidised with 25 parts of sodium hypochlorite as in the above example or with 50 parts of copper sulphate and 100 parts of 25% ammonia solution, then dyestuffs with similar properties are obtained.

Table

SC→M₁→M₂→EC

| No. | Starting component | (1)(2) middle component | end component | colour in substance | colour in water | colour of cellulose dyeing |
|---|---|---|---|---|---|---|
| 1 | 1-aminonaphthalene-4-sulphonic acid. | (1) 1-aminonaphthalene-6-sulphonic acid. (2) 1-amino-3-methylbenzene. | 1-aminonaphthalene-4-sulphonic acid. | brown-red | orange | yellow-brown. |
| 2 | 2-aminonaphthalene-4.8-disulphonic acid. | (1) 1-aminonaphthalene. (2) 1-amino-3-methylbenzene. | 2-aminonaphthalene-di-sulphonic acid. | do | orange-red | Do. |
| 3 | 2-aminonaphthalene-6.8-disulphonic acid. | (1) 1-aminonaphthalene. (2) 1-amino-3-methylbenzene. | 2-aminonaphthalene-6-sulphonic acid. | brown | orange | Do. |
| 4 | 1-aminonaphthalene-3.6-disulphonic acid. | (1) 1-aminonaphthalene. (2) 1-amino-3-methylbenzene. | 2-aminonaphthalene-5-sulphonic acid. | red-brown | do | Do. |
| 5 | 2-aminonaphthalene-4.8-disulphonic acid. | (1) 1-aminonaphthalene. (2) 1-amino-2-methoxy-5-methylbenzene. | 2-aminonaphthalene-6-sulphonic acid. | dark brown | orange-red | brown. |
| 6 | 1-aminonaphthalene-4-sulphonic acid. | (1) 1-aminonaphthalene-7-sulphonic acid. (2) 1-amino-3-acetylaminobenzene. | do | brown | orange | yellow-brown. |
| 7 | 2-aminonaphthalene-5.7-disulphonic acid. | (1) 1-aminonaphthalene-7-sulphonic acid. (2) 1-amino-3-acetylaminobenzene. | 2-aminonaphthalene | do | do | Do. |
| 8 | 2-aminonaphthalene-4.8-disulphonic acid. | (1) 1-aminonaphthalene-6-sulphonic acid. (2) 1-amino-3-methoxybenzene. | do | red-brown | do | Do. |
| 9 | 1-aminonaphthalene-3.6-disulphonic acid. | (1) 1-aminonaphthalene-6-sulphonic acid. (2) 1-amino-3-methoxybenzene. | 1-aminonaphthalene-3-sulphonic acid. | do | yellow-orange | yellow-orange. |
| 10 | 1-aminonaphthalene-4-sulphonic acid. | (1) 1-aminonaphthalene-6-sulphonic acid. (2) 1-amino-3-methylbenzene. | 2-aminonaphthalene-3.6-disulphonic acid. | brown | do | brown. |
| 11 | 2-aminonaphthalene-4.8-disulphonic acid. | (1) 1-aminonaphthalene-6-sulphonic acid. (2) 1-amino-3-methylbenzene. | 1-phenyl-3-methyl-5-iminopyrazole. | do | yellow-brown | yellow-brown. |
| 12 | do | (1) 1-aminonaphthalene-6-sulphonic acid. (2) 1-amino-3-methylbenzene. | 1-amino-3-methoxy-4-methylbenzene. | do | orange-brown | yellow-orange. |
| 13 | 1-aminonaphthalene-3.6-disulphonic acid. | (1) 1-aminonaphthalene. (2) 1-amino-3-methylbenzene. | 1-amino-3-hydroxybenzene-4-carboxylic acid. | do | do | Do. |
| 14 | 1-aminonaphthalene-4-sulphonic acid. | (1) 1-aminonaphthalene. (2) 1-amino-3-methylbenzene. | 2 amino 8-hydroxynaphthalene-6-sulphonic acid. | do | brown | brown. |
| 15 | 2-aminonaphthalene-4.8-disulphonic acid. | (1) 1-aminonaphthalene. (2) 1-amino-2-methoxy-5-methylbenzene. | 1.3-diaminobenzene-4-sulphonic acid. | do | do | Do. |
| 16 | do | (1) 1-aminonaphthalene-6-sulphonic acid. (2) 1-amino-2-methoxy-5-methylbenzene. | 2-aminonaphthalene-1-sulphonic acid. | red-brown | orange | yellow-brown. |

EXAMPLE 3

35.7 parts of 4-aminoazobenzene-3.4'-disulphonic acid are coupled by the known method with 10.7 parts of 1-amino-3-methylbenzene to form the amino disazo dyestuff. This is dissolved with a neutral reaction with 800 parts of water, 7 parts of sodium nitrite are added and it is diazotised by the addition of 32 parts of hydrochloric acid. A solution of 14.3 parts of 2-amino-naphthalene in 200 parts of water and 12 parts of hydrochloric acid is then added to the diazonium compound. The coupling can be accelerated by the addition of sodium acetate. The completely formed dyestuff is precipitated with sodium chloride, suspended in 1000 parts of water and heated to 98°. A solution of 50 parts of copper sulphate in 200 parts of water and 100 parts of 25% ammonia is added and the whole is boiled under reflux for 1 hour. The solution which originally was red-brown changes to yellow. After acidifying out and filtering off the formed dyestuff, the dyestuff is dissolved in 1500 parts of water with an alkaline reaction, salted out and filtered off. When dry, it is a brown powder which dissolves in water with a yellow-orange and in concentrated sulphuric acid with a blue color. It dyes natural or regenerated cellulose fibres yellow. The dyeing has excellent fastness to light and can be discharged white in both a neutral and alkaline medium. In the form of the free acid, the new dyestuff corresponds to the formula:

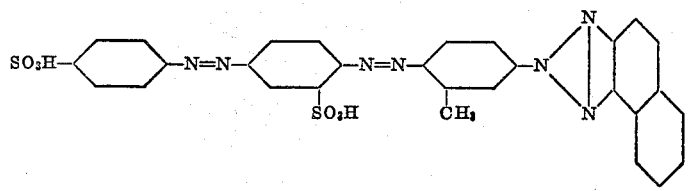

If in the above example the 35.7 parts of amino azobenzene disulphonic acid are replaced by the corresponding number of parts of one of the amino monoazo dyestuffs listed in the following table and the latter is coupled with the middle and end components given in the table to form the trisazo dyestuff and this is oxidised by the method described in the example or with a sodium hyprochlorite solution (corresponding to 25 parts of NaClO 100%) in an alkaline solution at a raised temperature, then dyestuffs with similar properties are obtained.

Table
SC→M→EC

| No. | Starting component | middle component | end component | colour in substance | colour in water | of cellulose dyeing |
|---|---|---|---|---|---|---|
| 1 | 4-aminoazobenzene-3.4'-disulphonic acid. | 1-amino-2-methoxy-5-methylbenzene. | 1-aminonaphthalene-4-sulphonic acid. | brown | orange | yellow. |
| 2 | 4-amino-4'-hydroxy-3'-carboxyazobenzene-3-sulphonic acid. | 1-amino-3-methylbenzene | 2-aminonaphthalene-6-sulphonic acid. | ___do___ | ___do___ | Do. |
| 3 | ___do___ | 1-amino-3-acetylaminobenzene. | ___do___ | ___do___ | ___do___ | Do. |
| 4 | 4-amino-2-methyl-4'-hydroxy-3'-carboxy-azobenzene-5'-sulphonic acid. | ___do___ | 2-amino-naphthalene | ___do___ | ___do___ | Do. |
| 5 | 4-amino-2-methyl-5-methoxy-4'-hydroxy-3'-carboxyazobenzene-5'-sulphonic acid. | 1-amino-3-methylbenzene | 2-aminonaphthalene-5-sulphonic acid. | ___do___ | yellow-orange. | Do. |
| 6 | 4-amino-3.2'-dimethylazobenzene-5.4'-disulphonic acid. | ___do___ | 1-aminonaphthalene-3-sulphonic acid. | ___do___ | ___do___ | Do. |
| 7 | 4-aminoazobenzene-3.4'-disulphonic acid. | ___do___ | 1-amino-3-methoxy-4-methyl-benzene. | ___do___ | ___do___ | Do. |
| 8 | ___do___ | ___do___ | 2-amino-5-hydroxynapthalene-7-sulphonic acid. | red-brown | brown-orange. | brown. |
| 9 | 4-p-aminodiphenyl-4'-hydroxy-3'-carboxyazobenzene. | 1-sulphacetylamino-3-amino-benzene. | 2-amino-naphthalene-6-sulphonic acid. | brown | orange | yellow-brown. |

EXAMPLE 4

52.5 parts of the amino disazo dyestuff 1-aminobenzene-4-sulphonic acid→1-aminonaphthalene-6-sulphonic acid→1-amino-3-methylbenzene in 800 parts of water are diazotised at 10–12° with 7 parts of sodium nitrite and 32 parts of hydrochloric acid and coupled in a weakly acid solution with 22.3 parts of 2-aminonaphthalene-6-sulphonic acid. The violet trisazo dyestuff is isolated, dissolved in 1000 parts of water and the reaction is made clearly alkaline with 10 parts of 30% caustic soda lye. The dyestuff solution is then treated at a raised temperature for about 1 hour with 25 parts of sodium hypochlorite 100% until the colour changes to and remains yellow brown. Sodium bicarbonate is added to neutralise the excess caustic soda lye, the dyestuff is salted out, filtered off and washed with concentrated sodium chloride solution. It corresponds to the formula:

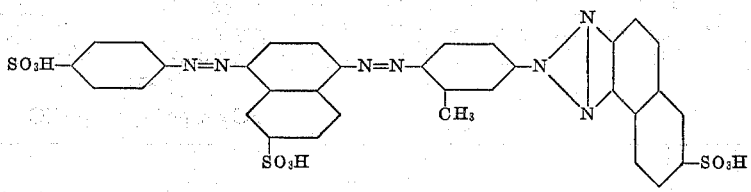

and, when dry it is a brown powder which dissolves in water with a yellow-orange and in concentrated sulphuric acid with a blue-green colour. Cotton, viscose, jute and ramie fibers are dyed in fast to light yellow-orange shades.

If in the above example the 52.5 parts of aminodisazo dyestuff are replaced by the equivalent number of parts of the amino disazo dyestuffs listed in the following table and these are coupled with the end components given in the table, then, after oxidizing with a sodium hypochlorite solution (corresponding to 25 parts of 100% NaClO) or 50 parts of crystallised copper sulphate in 200 parts of water and 100 parts of 25% ammonia solution, dyestuffs with similar properties are obtained.

Table
SC→M₁→M₂→EC

| No. | Starting component | (1) middle (2) component | end component | colour in substance | colour in water | of cellulose dyeing |
|---|---|---|---|---|---|---|
| 1 | 1-aminobenzene-4-sulphonic acid. | (1) 1-aminonaphthalene-6-sulphonic acid (2) 1-amino-3-acetylaminobenzene | 2-aminonaphthalene-6-sulphonic acid. | brown | yellow-orange. | yellow-orange. |
| 2 | ___do___ | (1) 1-aminonaphthalene-7-sulphonic acid (2) 1-amino-3-acetylaminobenzene | 1-aminonaphthalene-4-sulphonic acid. | ___do___ | ___do___ | orange. |
| 3 | 1-aminobenzene-2.5-disulphonic acid. | (1) 1-amino-3-methylbenzene (2) 1-amino-3-methylbenzene | 2-aminonaphthalene-6-sulphonic acid. | red-brown | orange | yellow. |
| 4 | ___do___ | (1) 1-amino-3-methylbenzene (2) 1-amino-3-methoxybenzene | 2-aminonaphthalene | ___do___ | ___do___ | Do. |
| 5 | ___do___ | (1) 1-aminonaphthalene (2) 1-amino-3-methylbenzene | ___do___ | brown | ___do___ | orange. |
| 6 | 1-aminobenzene-3-sulphonic acid. | (1) 1-amino-3-sulphacetylaminobenzene (2) 1-amino-3-methylbenzene | 2-aminonaphthalene-3.6-disulphonic acid. | red-brown | ___do___ | yellow. |
| 7 | ___do___ | (1) 1-aminonaphthalene-6-sulphonic acid (2) 1-amino-2-methoxy-5-methylbenzene | 2-aminonaphthalene-5-sulphonic acid. | brown | ___do___ | red-orange. |
| 8 | 1-amino-2.4-dimethylbenzene-6-sulphonic acid. | (1) 1-amino-3-methylbenzene (2) 1-amino-3-sulphacetylaminobenzene | 2-aminonaphthalene-6-sulphonic acid. | ___do___ | yellow-orange. | orange. |
| 9 | 1-aminobenzene-3-sulphonic acid. | (1) 1-amino-3-acetylaminobenzene (2) 1-amino-3-sulphacetylaminobenzene | 1-aminonaphthalene-4-sulphonic acid. | ___do___ | orange | yellow. |
| 10 | 1-amino-3-carboxy-4-hydroxybenzene-5-sulphonic acid. | (1) 1-aminobenzene (2) 1-amino-3-sulphacetylaminobenzene | 2-aminonaphthalene-3.6-disulphonic acid. | ___do___ | yellow-orange. | Do. |
| 11 | 1-aminobenzene-4-sulphonic acid. | (1) 1-amino-3-methylbenzene (2) 1-amino-3-sulphacetylaminobenzene | 2-amino-5-hydroxynaphthalene-7-sulphonic acid. | red-brown | orange | yellow-brown. |
| 12 | 1-aminobenzene-3-sulphonic acid. | (1) 1-amino-3-methylbenzene (2) 1-amino-3-sulphacetylaminobenzene | 2-amino-8-hydroxynaphthalene-6-sulphonic acid. | ___do___ | ___do___ | Do. |
| 13 | ___do___ | (1) 1-amino-3-methylbenzene (2) 1-amino-3-sulphacetylaminobenzene | 1-phenyl-3-methyl-5-iminopyrazole. | brown | ___do___ | yellow. |
| 14 | 1-aminobenzene-2.5-disulphonic acid. | (1) 1-amino-2-methoxy-5-methylbenzene (2) 1-amino-3-acetylaminobenzene | 2-aminonaphthalene-6-sulphonic acid. | red-brown | ___do___ | orange-red. |

EXAMPLE 5

54 parts of the amino disazo dyestuff 2-aminonaphthalene-4.8-disulphonic acid→1-amino-3-methylbenzene→1-amino-3-methylbenzene described in Example 1 are dissolved with a neutral reaction in 800 parts of water at 60° and diazotised at 0° with 7 parts of sodium nitrite and 32 parts of hydrochloric acid. A weakly acid solution of 15 parts of 1-amino-3-acetyl-aminobenzene is added to this diazonium compound. On completion of the coupling, the precipitated dyestuff is filtered off, pasted in 600 parts of water and diazotised at 0°. The suspension of the diazonium compound is poured into a solution of 22.3 parts of 2-aminonaphthalene-6-sulphonic acid in 300 parts of water to which 25 parts of sodium acetate have been added. To accelerate the coupling, sodium carbonate solution is added simultaneously until the reaction is neutral. The amino tetrakisazo dyestuff is salted out at 60°, filtered off and suspended in 1000 parts of water and heated to 95°. After the addition of 50 parts of crystallised copper sulphate in 200 parts of water and 100 parts of 25% ammonia solution, the whole is boiled under reflux for about 1½ hours, the initial red-violet solution changing colour to yellow-brown. The completely formed dyestuff is separated at 60° with sodium chloride, filtered off and washed free of adhering copper compounds with diluted sodium chloride solution. When dry, it is a red-brown powder which dissolves in water with an orange and in concentrated sulphuric acid with a blue colour. Its free acid corresponds to the formula:

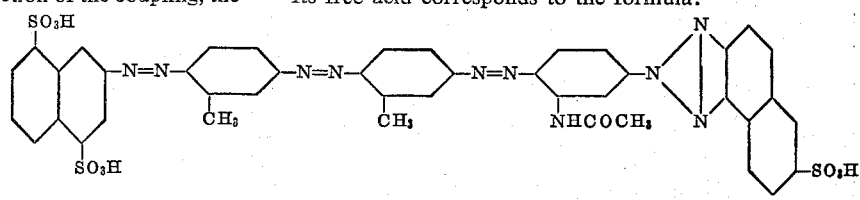

The dyeings attained with this dyestuff on cellulose fibers are yellow-brown and they are distinguished by good fastness to light. They can be discharged well.

If in the above example, the components used for forming the amino tetrakisazo dyestuff are altered according to the following table and the dyestuffs obtained are oxidised by the method according to the main example or with a solution containing 25 parts of sodium hypochlorite 100% in an alkaline medium, then dyestuffs with similar properties are obtained.

*Table*

SC→M₁→M₂→M₃→EC

| No. | Starting component | (1)(2)(3) middle component. | end component | colour in substance | colour in water | of cellulose dyeing |
|---|---|---|---|---|---|---|
| 1 | 2-amino-naphthalene-4.8-disulphonic acid. | (1) 1-amino-3-methylbenzene (2) 1-amino-3-methylbenzene (3) 1-amino-3-acetylamino-benzene. | 1-aminonaphthalene-4-sulphonic acid. | red-brown | orange | yellow-brown. |
| 2 | do | (1) 1-amino-3-methylbenzene (2) 1-amino-3-acetylaminobenzene (3) 1-amino-3-acetylaminobenzene. | 2-aminonaphthalene-6-sulphonic acid. | brown | do | Do. |
| 3 | 1-aminonaphthalene-3.6-disulphonic acid. | (1) 1-amino-3-methylbenzene (2) 1-amino-3-methylbenzene (3) 1-amino-3-acetylaminobenzene. | 2-aminonaphthalene. | brown-red | do | Do. |
| 4 | do | (1) 1-aminonaphthalene-6-sulphonic acid. (2) 1-amino-3-methylbenzene (3) 1-amino-3-acetylaminobenzene. | 2-aminonaphthalene-6-sulphonic acid. | red-brown | do | brown. |
| 5 | 2-aminonaphthalene-5.7-disulphonic acid. | (1) 1-aminonaphthalene-6-sulphonic acid. (2) 1-amino-3-methylaminobenzene (3) 1-amino-3-acetylaminobenzene. | do | do | brown-orange | Do. |
| 6 | 1-aminonaphthalene-3.6-disulphonic acid. | (1) 1-aminobenzene (2) 1-amino-3-methylaminobenzene (3) 1-amino-3-methylbenzene. | do | brown | orange | yellow-brown. |
| 7 | do | (1) 1-amino-3-methylbenzene (2) 1-amino-2-methoxy-3-methylbenzene. (3) 1-amino-3-methylbenzene. | 1-aminonaphthalene-4-sulphonic acid. | red-brown | do | Do. |
| 8 | 1-aminobenzene-4-sulphonic acid. | (1) 1-aminonaphthalene-6-sulphonic acid. (2) 1-amino-3-methylbenzene (3) 1-amino-3-methylbenzene. | 2-aminonaphthalene-6-sulphonic acid. | brown-red | brown-orange | brown. |
| 9 | 1-aminobenzene-2.5-disulphonic acid. | (1) 1-aminonaphthalene-6-sulphonic acid. (2) 1-amino-3-acetylaminobenzene (3) 1-amino-3-methylbenzene. | 1-aminonaphthalene-3-sulphonic acid. | brown | do | Do. |
| 10 | 1-aminobenzene-3-sulphonic acid. | (1) 1-aminonaphthalene-7-sulphonic acid. (2) 1-amino-3-acetylaminobenzene (3) 1-amino-3-methylbenzene. | 2-aminonaphthalene-3.6-disulphonic acid. | brown-red | orange | Do. |
| 11 | do | (1) 1-aminonaphthalene-7-sulphonic acid. (2) 1-amino-2-methoxy-3-methylbenzene. (3) 1-amino-3-acetylaminobenzene. | 2-naphthlaymine-5-sulphonic acid. | red-brown | orange-brown | Do. |
| 12 | aminoazobenzene disulphonic acid. | (1) (2) 1-aminonaphthalene-6-sulphonic acid. (3) 1-amino-3-acetylaminobenzene. | 2-naphthylamine. | do | orange | yellow-brown. |
| 13 | do | (1) (2) 1-aminonaphthalene-6-sulphonic acid. (3) 1-amino-3-methylbenzene. | 1-aminonaphthalene-4-sulphonic acid. | brown | do | Do. |
| 14 | 4-amino-4'-hydroxy-3'-carboxyazobenzene-3-sulphonic acid. | (1) (2) 1-aminonaphthalene. (3) 1-amino-3-methylbenzene. | 2-aminonaphthalene-3.6-disulphonic acid. | brown-red | do | Do. |
| 15 | 4-amino-2-methyl azobenzene-2'.5'-disulphonic acid. | (1) (2) 1-aminonaphthalene. (3) 1-amino-3-methylbenzene. | 2-aminonaphthalene-6-sulphonic acid. | red-brown | do | Do. |

EXAMPLE 6

A liquor is made from 1.0 part of the dyestuff obtained according to Example 1 and 3 parts of sodium carbonate dissolved in 3000 parts of water. 100 parts of cotton are entered at 40–50°, the bath is heated within 30 minutes to 90–95°, 45 parts of sodium sulphate are added and dyeing is performed for 60 minutes at this temperature. The goods are then rinsed cold and dried in the usual manner. The cotton is dyed in yellow-orange shades which have good fastness to light. The dyeing can be discharged well in a neutral and alkaline medium.

The dyestuffs described in Examples 1–5 can be dyed in a similar manner.

What we claim is:

1. A disazo dyestuff corresponding to the formula

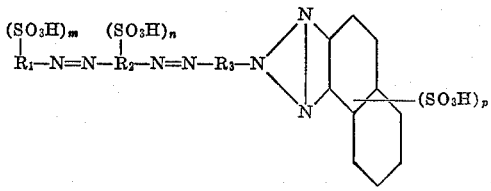

wherein $R_1$ represents a member selected from the group consisting of phenyl and naphthyl radicals, $R_2$ represents an aromatic middle component radical selected from the group consisting of phenylene and naphthylene radicals, the —N=N— groups being in p-position to each other, $R_3$ represents a mononuclear carbocyclic middle component radical of the benzene series, the bonds shown being in p-position to each other, $m$ is an integer from 1 to 3 inclusive, $n$ is an integer from 0 to 3 inclusive and $p$ is an integer from 0 to 2 inclusive, the sum of $m$ and $n$ being not more than 3 and the sum of $m$, $n$ and $p$ being at least 2 and not more than 4.

2. A disazo dyestuff corresponding to the general formula:

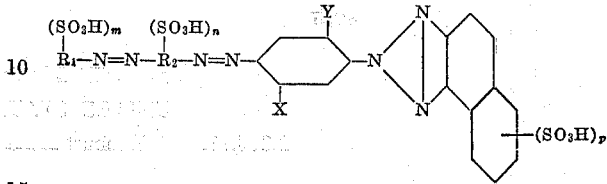

wherein:

$R_1$ represents a member selected from the group consisting of the phenyl and the naphthyl radical, $R_2$ represents an aromatic middle component radical containing at least one six-membered carbocyclic nucleus and at most two such nuclei condensed with one another, the —N=N— groups being in p-position to each other, X represents a member selected from the group consisting of —H, —CH$_3$, —OCH$_3$ and —NHacyl, Y represents a member selected from the group consisting of —H, —CH$_3$, —OCH$_3$, $m$ is one of the numerals 1 and 2, $n$ and $p$ are each one of the numerals 0 and 1.

3. A disazo dyestuff corresponding to the formula:

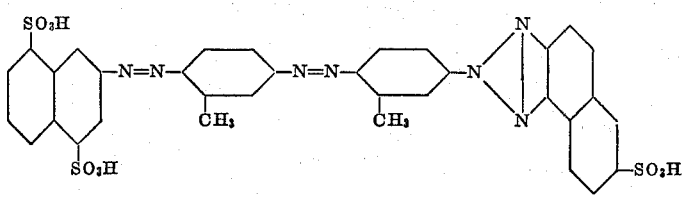

4. A disazo dyestuff corresponding to the formula:

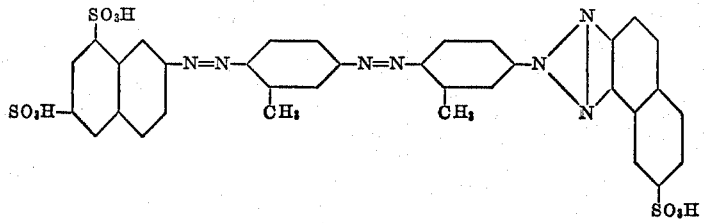

5. A disazo dyestuff corresponding to the formula:

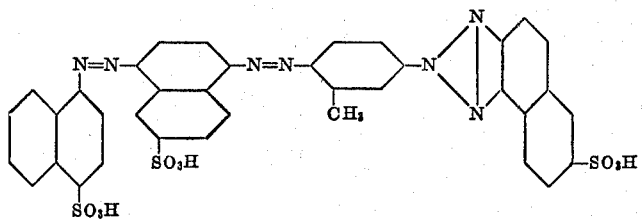

6. A disazo dyestuff corresponding to the formula:

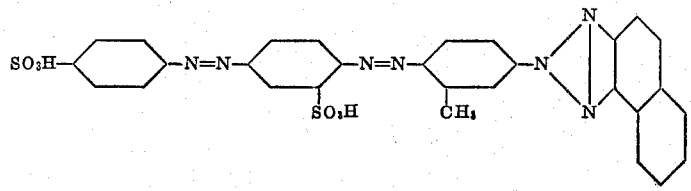

7. A disazo dyestuff corresponding to the formula:
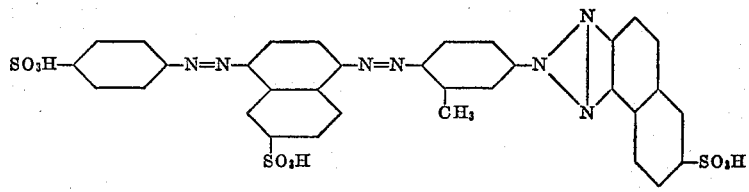
References Cited in the file of this patent
UNITED STATES PATENTS
2,268,935   Hanhart _____ Jan. 6, 1942